(12) United States Patent
Taniguchi (10) Patent No.: US 11,654,720 B2
(45) Date of Patent: May 23, 2023

(54) TIRE

(71) Applicant: Sumitomo Rubber Industries, Ltd., Kobe (JP)

(72) Inventor: Hidetoshi Taniguchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 419 days.

(21) Appl. No.: 16/945,209

(22) Filed: Jul. 31, 2020

(65) Prior Publication Data

US 2021/0039444 A1 Feb. 11, 2021

(30) Foreign Application Priority Data

Aug. 7, 2019 (JP) .............................. JP2019-145647

(51) Int. Cl.
*B60C 11/01* (2006.01)
*B60C 11/13* (2006.01)
*B60C 11/03* (2006.01)
*B60C 11/04* (2006.01)

(52) U.S. Cl.
CPC .......... *B60C 11/01* (2013.01); *B60C 11/1315* (2013.01); *B60C 11/04* (2013.01); *B60C 2011/0348* (2013.01); *B60C 2011/0397* (2013.01)

(58) Field of Classification Search
CPC ... B60C 11/01; B60C 11/04; B60C 2011/013; B60C 2011/0348; B60C 2011/0397
See application file for complete search history.

(56) References Cited

U.S. PATENT DOCUMENTS

| 6,488,064 | B1 * | 12/2002 | Radulescu | B60C 11/12 152/209.27 |
| 2007/0151646 | A1 * | 7/2007 | Ito | B60C 11/12 152/DIG. 3 |
| 2009/0133792 | A1 * | 5/2009 | Chun | B60C 11/01 152/209.18 |
| 2018/0147894 | A1 * | 5/2018 | Haseda | B60C 11/1323 |
| 2019/0001755 | A1 * | 1/2019 | Okuno | B60C 11/1323 |

FOREIGN PATENT DOCUMENTS

| JP | H11-048716 | * | 2/1999 |
| JP | 2015-150962 | * | 8/2015 |
| WO | WO 03/033280 A1 | | 4/2003 |

OTHER PUBLICATIONS

English machine translation of JPH11-048716. (Year: 1999).*
English machine translation of JP2015-150962. (Year: 2015).*

* cited by examiner

*Primary Examiner* — Robert C Dye
(74) *Attorney, Agent, or Firm* — Birch, Stewart, Kolasch & Birch, LLP (57) ABSTRACT

A tire comprises a tread portion whose shoulder land part is provided with a narrow circumferential groove having an axially inner wall surface, an axially outer wall surface and a groove bottom including a deepest point. The axially inner wall surface has a radially inner curved portion concaved toward the axially inside, and the axially outer wall surface has a radially inner curved portion concaved toward the axially outside. the radially outer end of the radially inner curved portion of the axially inner wall surface is positioned radially inside the radially outer end of the radially inner curved portion of the axially outer wall surface.

13 Claims, 6 Drawing Sheets

TIRE

TECHNICAL FIELD

The present invention relates to a vehicle tire.

BACKGROUND ART

The following Patent Document 1 discloses a pneumatic tire whose tread portion is provided with a narrow circumferential groove disposed near the tread edge to prevent uneven wear.

Patent Document 1: International Patent Application Publication No. WO 03/033280A1

SUMMARY OF THE INVENTION

Problems to be Solved by the Invention

The pneumatic tire disclosed in the Patent Document 1 has room for improvement in the crack resistance at the bottom of the narrow circumferential groove and the uneven wear resistance.

It is therefore, an object of the present invention to provide a pneumatic tire in which the groove bottom crack resistance and the uneven wear resistance can be improved.

According to the present invention, a tire comprises:

a tread portion provided with a shoulder land part including a tread edge, wherein the shoulder land part is provided with a narrow circumferential groove which extends in the tire circumferential direction and has an axially inner wall surface, an axially outer wall surface and a groove bottom including a deepest point, the axially inner wall surface is provided, on its groove bottom side, with a radially inner curved portion which is concaved toward the inner side in the tire axial direction, the axially outer wall surface is provided, on its groove bottom side, with a radially inner curved portion which is concaved toward the outer side in the tire axial direction, wherein the radially outer end of the radially inner curved portion of the axially inner wall surface is positioned radially inside the radially outer end of the radially inner curved portion of the axially outer wall surface, It is preferable that the deepest point of the groove bottom is positioned axially outside a groove center line of the narrow circumferential groove.

It is preferable that the axially outer wall surface comprises the above-said radially inner curved portion, and a radially outer flat portion extending radially outwardly from the radially outer end of the radially inner curved portion.

It is preferable that the deepest point of the groove bottom is positioned axially outside a radially inward extension of the above-said axially outer flat portion of the axially outer wall surface.

It is preferable that the axially inner wall surface comprises the above-said radially inner curved portion, and a radially outer flat portion extending radially outwardly from the radially outer end of the radially inner curved portion.

It is preferable that the axial distance between the axially innermost point of the radially inner curved portion and the radially outer flat portion of the axially inner wall surface is smaller than the axial distance between the axially outermost point of the radially inner curved portion and the radially outer flat portion of the axially outer wall surface.

The shoulder land part is defined between the tread edge and a shoulder main groove extending continuously in the tire circumferential direction, whereby the shoulder land part is divided into an axially inner portion between the shoulder main groove and the narrow circumferential groove, and an axially outer portion between the tread edge and the narrow circumferential groove, and the radially outer surface of the axially outer portion is preferably positioned radially inside the radially outer surface of the axially inner portion.

It is preferable that the groove depth of the narrow circumferential groove is not more than 1.5 times the groove depth of the shoulder main groove.

It is preferable that an axial dimension of the axially outer portion measured at the axially outermost point of the radially inner curved portion of the axially outer wall surface is in a range from 1.0 to 1.4 times the axial dimension of the radially outer surface of the axially outer portion.

It is preferable that the groove width of the narrow circumferential groove measured at its opened top is not more than the maximum width of the narrow circumferential groove occurring on its groove bottom side.

Therefore, in the tire according to the present invention, the radially inner curved portions of the axially inner and outer wall surfaces can disperse the strain occurring when the shoulder land part contacts with the ground, therefore, the narrow circumferential groove can prevent the strain from being concentrated at its groove bottom, and the groove bottom crack resistance is improved.

For example, when compared between an axially outer portion and an axially inner portion of the shoulder land part which are on the axially outside and the axially inside of the narrow circumferential groove, respectively, the ground contact pressure when running straight becomes higher in the axially inner portion than the axially inner portion.

In the tire according to the present invention, since the radially outer end of the radially inner curved portion of the axially inner wall surface is positioned radially inside the radially outer end of the radially inner curved portion of the axially outer wall surface, the rigidity in the tire radial direction of the shoulder land part adjacent to the narrow circumferential groove on the tire equator side becomes higher than the rigidity in the tire radial direction of the shoulder land part adjacent to the narrow circumferential groove on the tread edge side. As a result, the rigidity balance between the shoulder land part on the tire equator side and the shoulder land part on the tread edge side is improved, and the uneven wear resistance of the shoulder land part is improved. Therefore, the tire according to the present invention is improved in the groove bottom crack resistance and uneven wear resistance.

DESCRIPTION OF THE PREFERRED EMBODIMENTS

The present invention can be applied to various tires such as pneumatic tires and non-pneumatic tires so called airless tires, for various vehicles such as passenger cars, heavy vehicles, and motorcycles.

Taking a pneumatic tire for heavy vehicle as an example, an embodiment of the present invention will now be described in conjunction with accompanying drawings.

As well known in the art, a pneumatic tire comprises a tread portion whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

Figure 1:
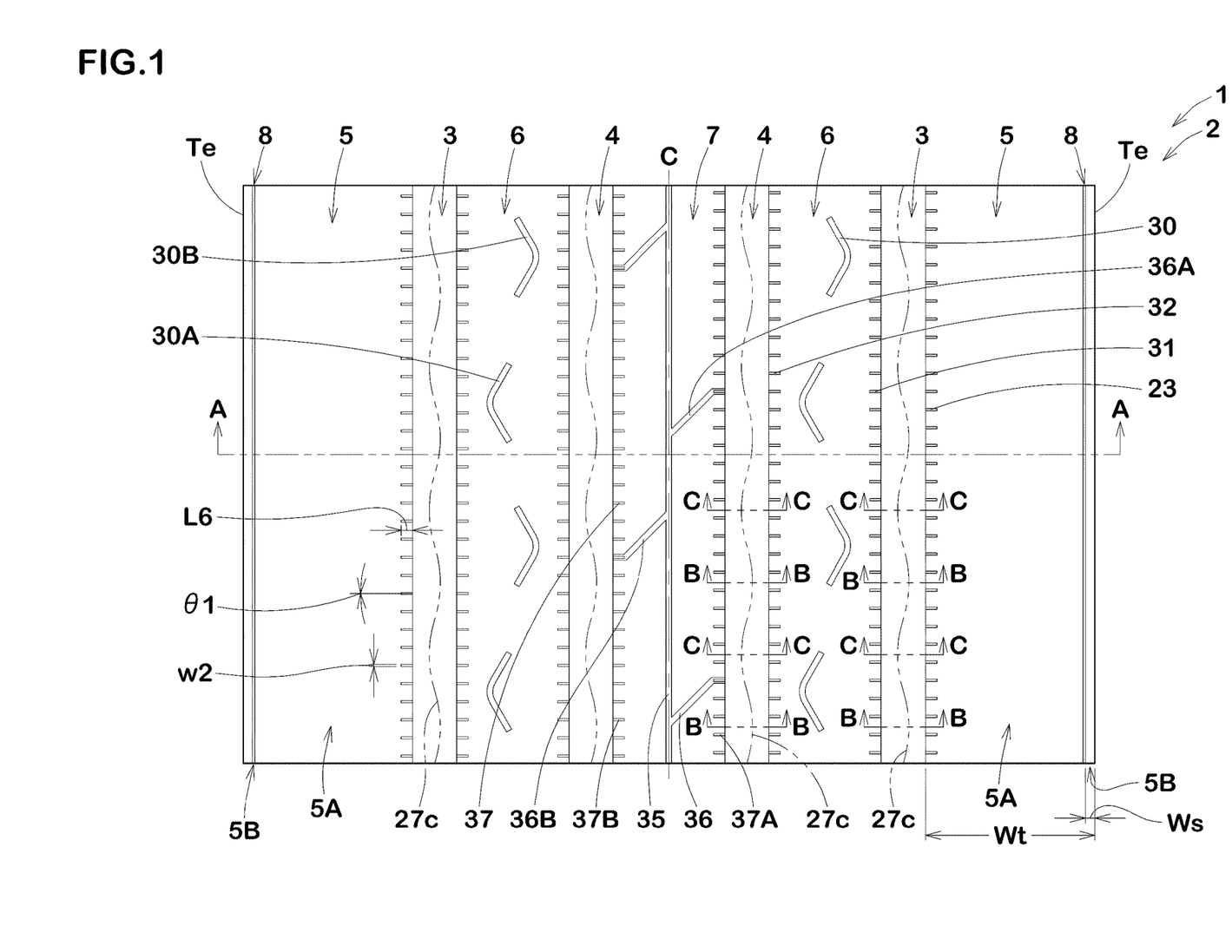
FIG. 1 is a developed partial view of the tread portion of a tire as an embodiment of the present invention.

FIG. 1 shows a part of a tread portion 2 of a pneumatic tire 1 as an embodiment of the present invention.

The tread portion 2 is provided with a shoulder main groove 3 extending continuously in the tire circumferential direction. Thus, the tread portion 2 comprises a shoulder land part 5 defined between the shoulder main groove 3 and a tread edge Te.

Figure 2:
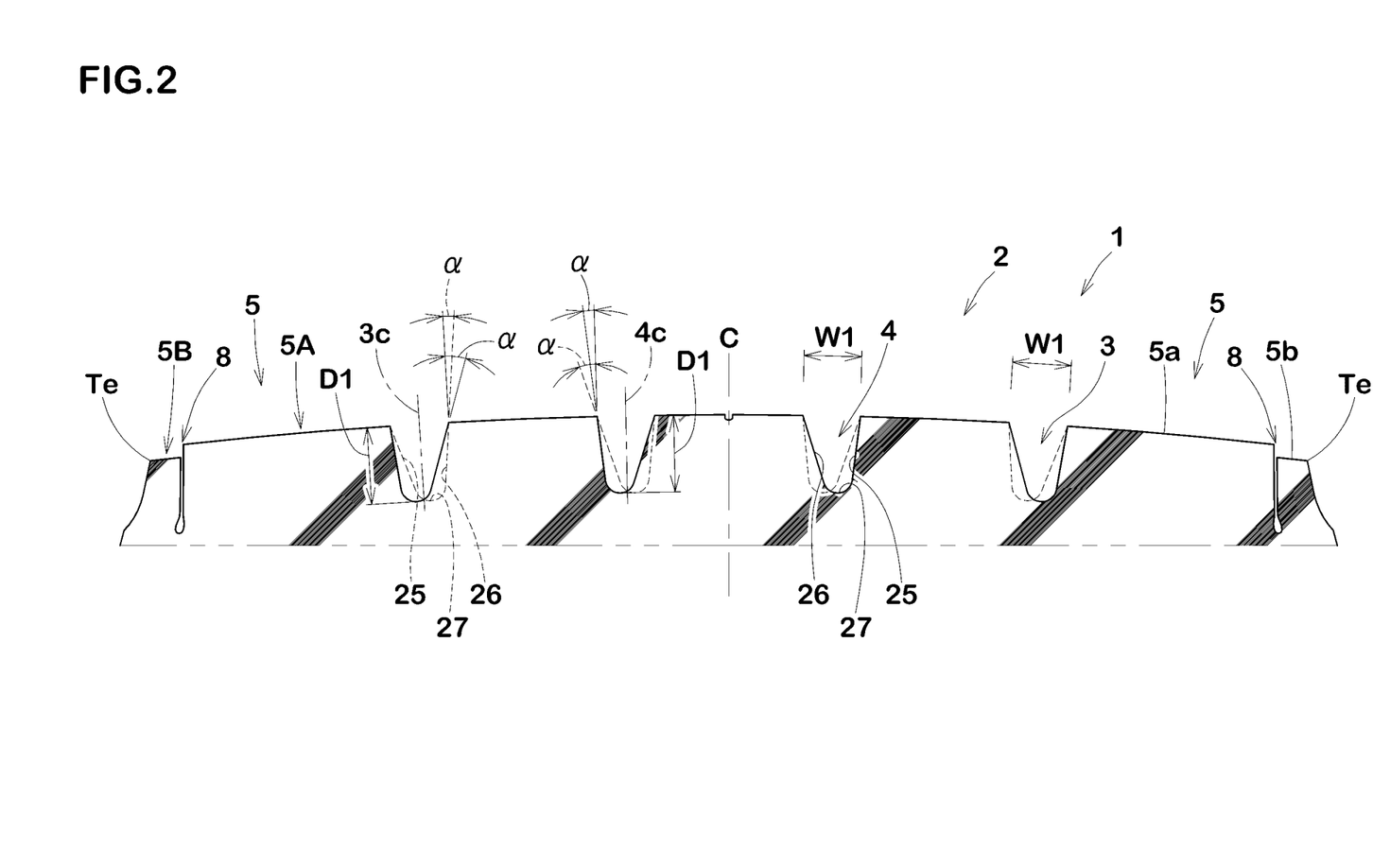
FIG. 2 is a cross sectional view of the tread portion taken along line A-A of FIG. 1.

In the present embodiment, the shoulder main groove 3 and the shoulder land part 5 are provided on each side of the tire equator C as shown in FIG. 1 and FIG. 2.

In the present embodiment, each of the shoulder land parts 5 is provided with a narrow circumferential groove 8 extending in the tire circumferential direction.

Thereby, the shoulder land part 5 is subdivided into an axially inner portion 5A between the narrow circumferential groove 8 and the shoulder main groove 3, and an axially outer portion 5B between the narrow circumferential groove 8 and the tread edge Te.

Figure 3:
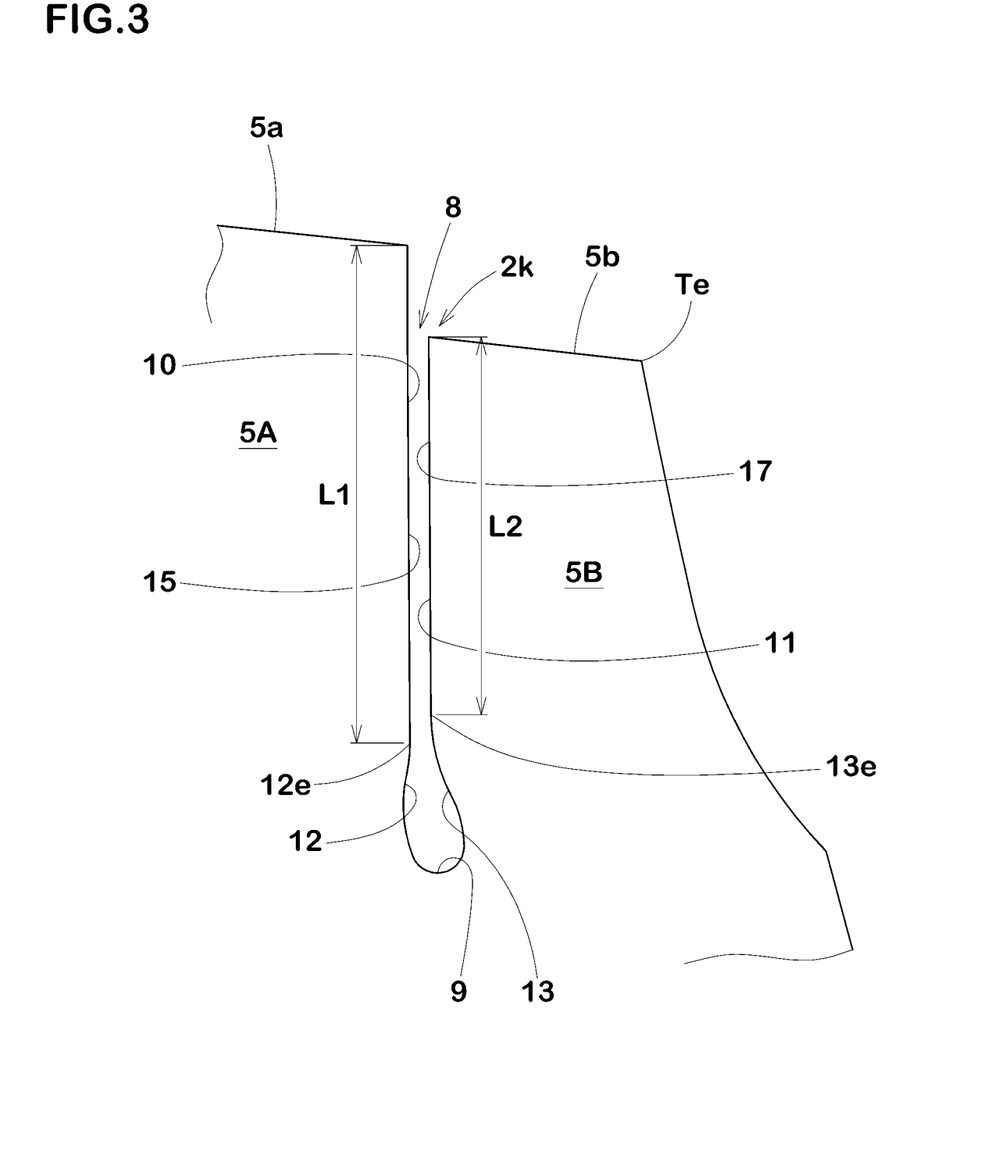
FIG. 3 is an enlarged cross sectional view of a shoulder portion.

FIG. 3 is a cross-sectional view of the narrow circumferential groove 8 perpendicular to the longitudinal direction thereof.

As shown in FIG. 3, the narrow circumferential groove 8 has an axially inner wall surface 10, an axially outer wall surface 11, and a groove bottom 19 having a deepest point 9.

The axially inner wall surface 10 is provided, on its groove bottom side, with a radially inner curved portion 12 which is concaved toward the inner side in the tire axial direction.

The axially outer wall surface 11 is provided, on its groove bottom side, with an radially inner curved portion 13 which is concaved toward the outer side in the tire axial direction.

Thereby, the strain caused when the shoulder land part 5 contacts with the ground can be dispersed on the radially inner curved portion 12 and the radially inner curved portion 13, therefore, the narrow circumferential groove 8 can prevent the strain from being concentrated on the deepest point of the groove bottom 9, and the groove bottom crack resistance is improved.

The radially outer end 12e of the radially inner curved portion 12 is positioned radially inside the radially outer end 13e of the radially inner curved portion 13.

Further, the radial dimension L1 between the radially outer end 12e of the radially inner curved portion 12 and the radially outer surface 5a of the axially inner portion 5A is larger than the radial dimension L2 between the radially outer end 13e of the radially inner curved portion 13 and the radially outer surface 5b of the axially outer portion 5B.

As a result, the rigidity in the tire radial direction of the axially inner portion 5A near the narrow circumferential groove 8 becomes higher than the rigidity in the tire radial direction of the axially outer portion 5B near the narrow circumferential groove 8. Therefore, the rigidity balance between the axially inner portion 5A and the axially outer portion 5B is improved, and uneven wear of the shoulder land part 5 due to the difference in the ground contact pressure during straight running is suppressed.

Figure 4:
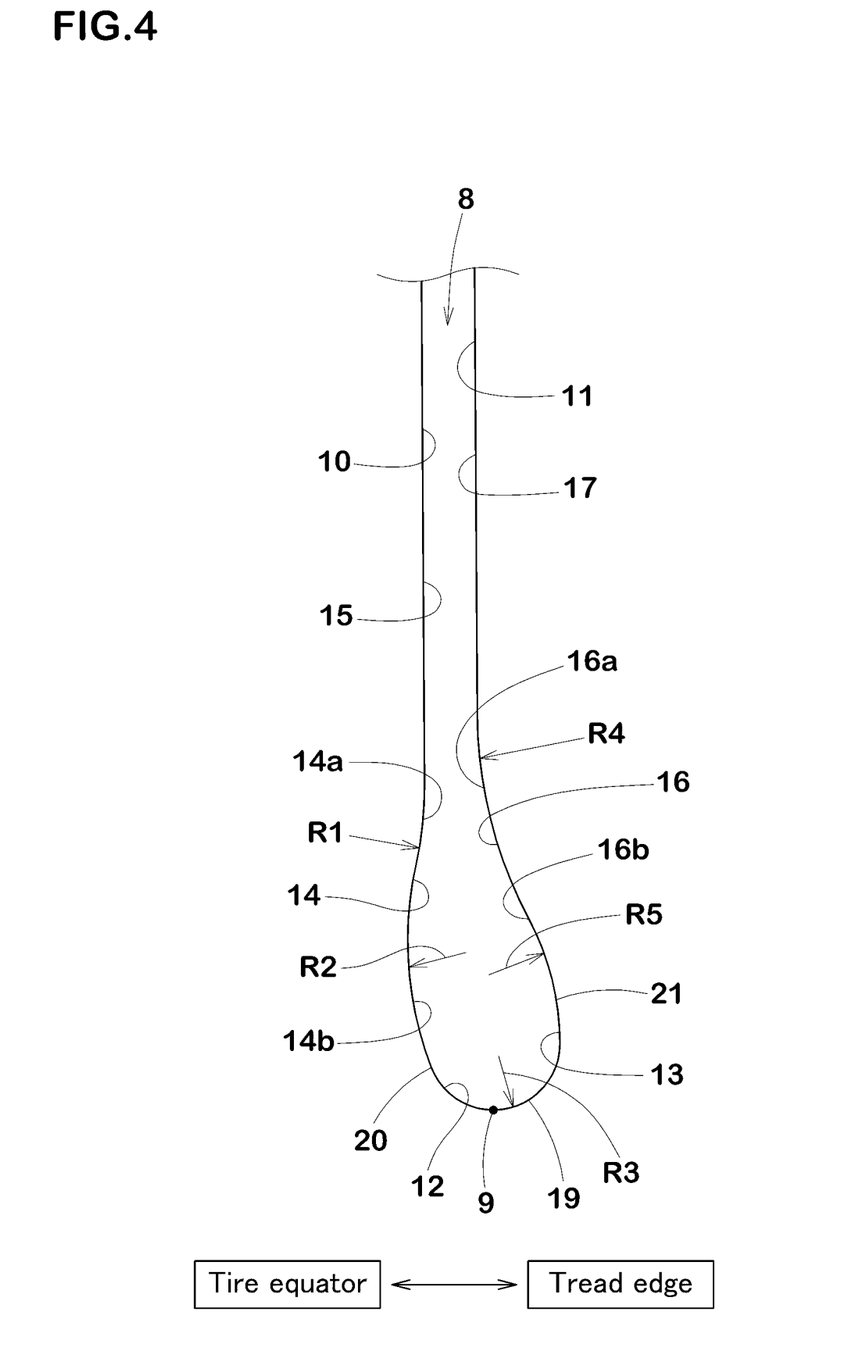
FIG. 4 is an enlarged cross sectional view of the narrow circumferential groove.

FIG. 4 is an enlarged cross sectional partial view of the narrow circumferential groove 8 taken perpendicularly to the longitudinal direction of the groove.

As shown, the axially inner wall surface 10 comprises the above-said radially inner curved portion 12, and a radially outer flat portion 15 extending radially outwardly from the radially outer end 12e of the radially inner curved portion 12.

The radially inner curved portion 12 includes a radially outer convex surface 14a and a radially inner concave surface 14b.

The radially outer convex surface 14a is smoothly continuous with the radially inner concave surface 14b.

The radially outer convex surface 14a is smoothly continuous with the axially inner flat portion 15.

In the cross sectional view of the narrow circumferential groove 8 perpendicular to the longitudinal direction of the groove, the radially outer convex surface 14a may be a circular arc whose center is located on the tire equator C side of the radially inner curved portion 12, and the radially inner concave surface 14b may be a circular arc whose center is located on the tread edge Te side of the radially inner curved portion 12.

Such convex surface 14a and concave surface 14b (generically 14) can disperse the ground contact pressure on the tire equator C side and the tread edge Te side so that the groove bottom crack resistance is improved.

The radially outer flat portion 15 extends from the radially outer end of the radially outer convex surface 14a to the radially outer surface 5a of the axially inner portion 5A as shown in FIG. 3.

In the cross sectional view of the narrow circumferential groove 8 perpendicular to the longitudinal direction of the groove, the radially outer flat portion 15 is a substantially flat surface inclined to the axially outside toward the radially inside from the radially outer surface 5a, at an angle slightly larger than 90 degrees with respect to the radially outer surface 5a.

such radially outer flat portion 15 disperses the ground contact pressure when running straight, and reduces the strain occurring at the groove bottom.

The axially outer wall surface 11 comprises the above-said radially inner curved portion 13, and an radially outer flat portion 17 which is a substantially flat surface extending radially outwardly from the radially outer end 13e of the radially inner curved portion 13.

The radially inner curved portion 13 includes a radially outer convex surface 16a and a radially inner concave surface 16b. The radially outer convex surface 16a is smoothly continuous with the radially inner concave surface 16b. The radially outer convex surface 16a is smoothly continuous with the axially outer flat portion 17.

In the cross sectional view of the narrow circumferential groove 8 perpendicular to the longitudinal direction of the groove, the radially outer convex surface 16a may be a circular arc whose center is located on the tread edge Te side of the radially inner curved portion 13, and the radially inner concave surface 16b may be a circular arc whose center is located on the tire equator C side of the radially inner curved portion 13.

such convex surface 16a and concave surface 16b (generically 16) can disperse the ground contact pressure on the tire equator C side and the tread edge Te side so that the groove bottom crack resistance is improved.

In the cross sectional view of the narrow circumferential groove 8 perpendicular to the longitudinal direction of the groove, the groove bottom 19 is an arc, preferably a circular arc, concaved toward the radially inner side.

The radially inner concave surface 14b and the radially inner concave surface 16b smoothly continue to the groove bottom 19 to improve the groove bottom crack resistance.

In this example, the radially inner curved portion 12 includes an optional radially inner second concave surface 20 extending radially inwardly from the radially inner end of the radially inner concave surface 14a, and the radially inner curved portion 13 includes an optional radially inner second concave surface 21 extending radially inwardly from the radially inner end of the radially inner concave surface 16a.

Therefore, in this example, the radially inner concave surface 14b and the radially inner concave surface 16b smoothly connected to the groove bottom 19 through the radially inner second concave surface 20 and the radially inner second concave surface 21, respectively.

Incidentally, the expression "smoothly" connect, continue, extend and the like means that there is no inflection point.

In this embodiment, in the cross sectional view of the narrow circumferential groove 8 perpendicular to the longitudinal direction of the groove:

the radially outer convex surface 14a is a circular arc whose radius of curvature R1 is preferably not less than 1.0 mm, more preferably not less than 3.0 mm, but preferably not more than 7.0 mm, more preferably not more than 5.0 mm;

the radially inner concave surface 14b is a circular arc whose radius of curvature R2 is smaller than the radius of curvature R1, and preferably not less than 1.5 mm, more preferably not less than 3.0 mm, but preferably not more than 5.5 mm, more preferably not more than 4.0 mm;

the radially inner second concave surface 20 is a circular arc whose radius of curvature is smaller than the radius of curvature R1, and preferably not less than 1.5 mm, more preferably not less than 3.0 mm, but preferably not more than 5.5 mm, more preferably not more than 4.0 mm;

the groove bottom 19 is a circular arc whose radius of curvature R3 is preferably smaller than the radius of curvature R1 and the radius of curvature R2, and preferably not less than 0.25 mm, more preferably not less than 0.50 mm, but preferably not more than 1.25 mm, more preferably not more than 1.00 mm;

the radially outer convex surface 16a is a circular arc whose radius of curvature R4 is preferably larger than the radius of curvature R1, and preferably not less than 4.0 mm, more preferably not less than 6.0 mm, but preferably not more than 8.0 mm, more preferably not more than 7.0 mm;

the radially inner concave surface 16b is a circular arc whose radius of curvature R5 is preferably smaller than the radius of curvature R4 and preferably larger than the radius R3 of curvature and the radius of curvature R5, and preferably not less than 1.0 mm, more preferably not less than 3.0 mm, but preferably not more than 7.0 mm, more preferably not more than 5.0 mm; and the radially inner second concave surface 21 is a circular arc whose radius of curvature is preferably smaller than the radius of curvature R4 and preferably larger than the radius R3 of curvature and the radius of curvature R5, and preferably not less than 1.0 mm, more preferably not less than 3.0 mm, but preferably not more than 7.0 mm, more preferably not more than 5.0 mm.

In the present embodiment, the radially outer flat portion 17 extends linearly from the radially outer surface 5b of the axially outer portion 5B to the radially outer convex surface 16a, while inclining to the axially outer side.

Such radially outer flat portion 17 disperses the ground contact pressure when running straight and reduces the strain occurring in the groove bottom.

Further, in the cross-sectional view of the narrow circumferential groove 8, the radially outer flat portion 17 and the radially outer flat portion 15 are parallel with each other or tapered toward the radial inner side. In other words, the distance therebetween is constant or gradually decreased from the radially outside to the radially inside.

Figure 5:
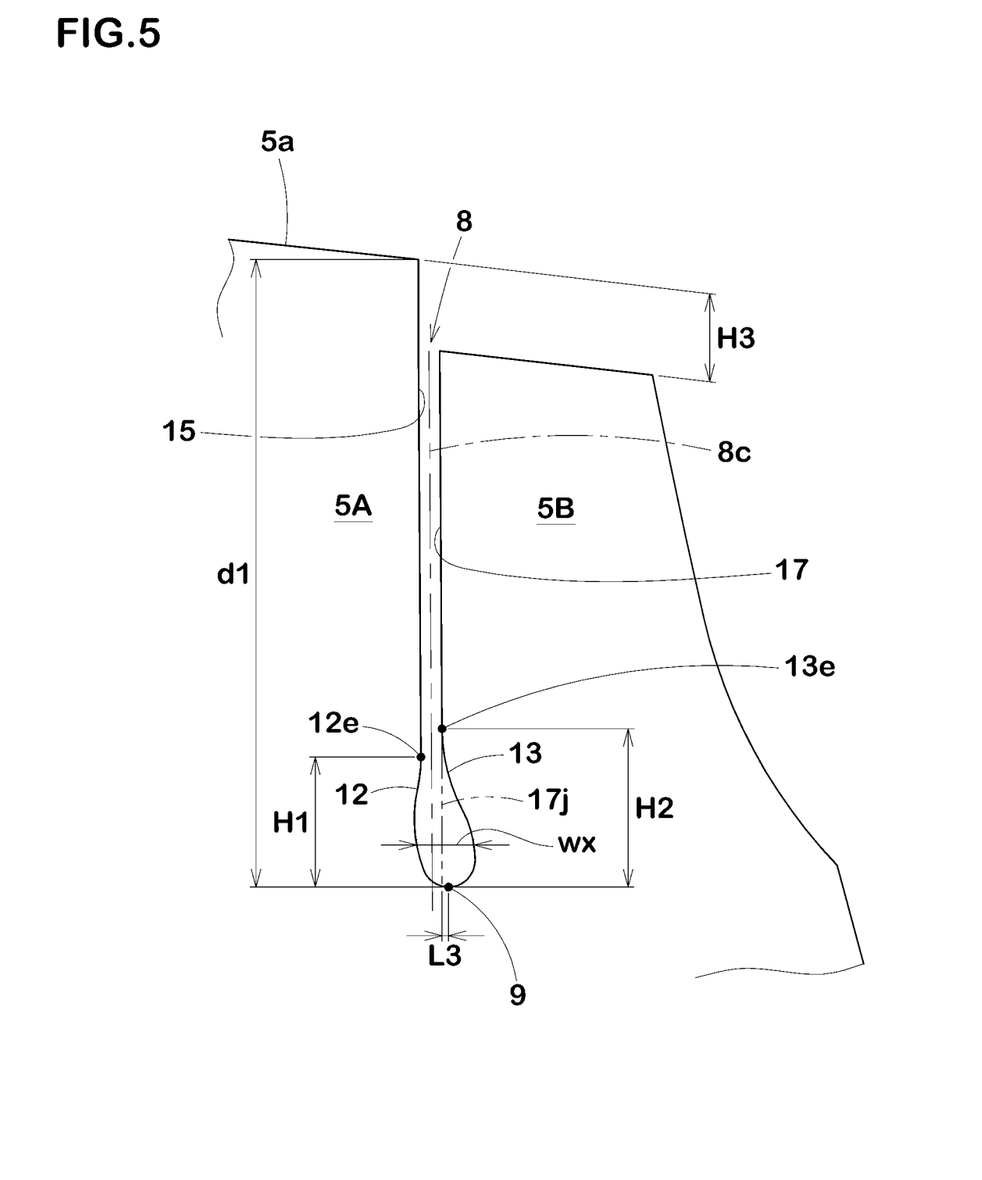
FIG. 5 is an enlarged cross sectional view of the shoulder portion.

It is preferable that, as shown in FIG. 5, the radial height H1 of the radially outer end 12e of the radially inner curved portion 12 from the deepest point of the groove bottom 9 is not more than 4 mm, whereas the radial height H2 of the radially outer end 13e of the radially inner curved portion 13 from the deepest point of the groove bottom 9 is more than 4 mm.

As a result, it is possible to appropriately disperse the ground contact pressure when running straight, while suppressing the rigidity of the axially inner portion 5A near the narrow circumferential groove 8 and the rigidity of the axially outer portion 5B near the narrow circumferential groove 8 from decreasing.

Preferably, the radial height H1 is not less than 3.0 mm. Preferably, the radial height H2 is not more than 50%, more preferably not more than 30% of the groove depth dl of the narrow circumferential groove 8 from the radially outer surface 5a of the axially inner portion 5A to the deepest point 9 of the groove bottom 19.

Preferably, the radial height H2 is not more than 85%, more preferably not more than 50% of the groove depth D1 of the shoulder main groove 3.

The deepest point 9 of the groove bottom 19 is positioned on the tread edge Te side of the center line 8c of the narrow circumferential groove 8 which is defined by the widthwise center line between the radially outer flat portion 15 and the radially outer flat portion 17.

Such narrow circumferential groove 8 maintains the rigidity of the axially inner portion 5A near the narrow circumferential groove 8 higher than the rigidity of the axially outer portion 5B near the narrow circumferential groove 8, and can enhance the uneven wear resistance.

Further, the deepest point 9 of the groove bottom 19 is positioned on the tread edge Te side of a radially inward extension 17j of the radially outer flat portion 17. As a result, the above-mentioned action is exhibited more effectively.

Preferably, the axial distance L3 between the deepest point 9 of the groove bottom 19 and the radially inward extension 17j is set in a range from 10% to 35% of the maximum width wx of the narrow circumferential groove 8 measured perpendicularly to the above-said center line 8c.

If the axial distance L3 is too large, there is a possibility that the rigidity in the vicinity of the groove bottom 19 becomes low, and the groove bottom crack resistance becomes deteriorated.

Figure 6:
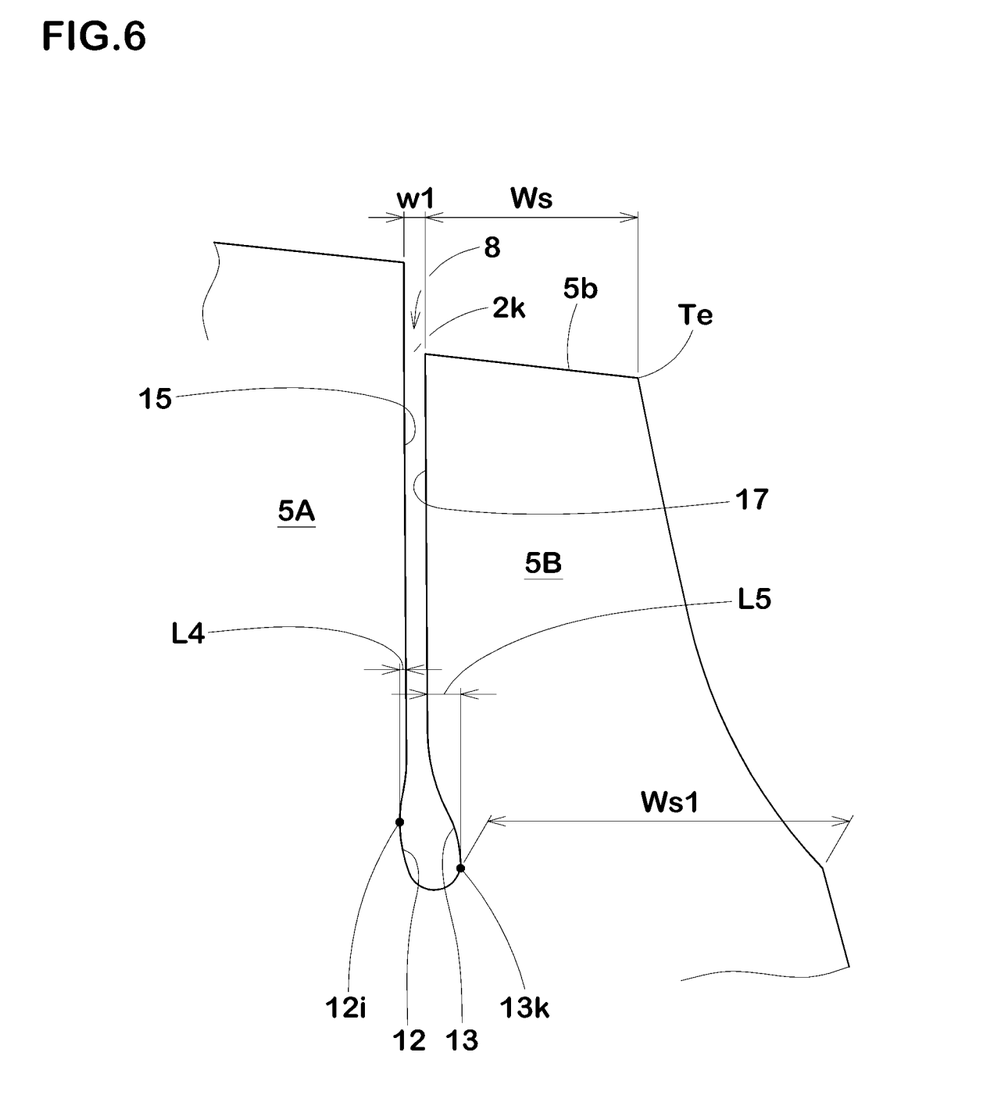
FIG. 6 is an enlarged cross sectional view of the shoulder portion.

It is preferable that, as shown in FIG. 6, the axial distance L4 between the axially inner flat portion 15 and the axially innermost point 12i of the radially inner curved portion 12 is smaller than
the axial distance L5 between the radially outer flat portion 17 and the axially outermost point 13k of the radially inner curved portion 13.

More preferably, the axial distance L4 is in a range from 10% to 35% of the axial distance L5.

As a result, the rigidity balance between the axially inner portion 5A near the narrow circumferential groove 8 and the axially outer portion 5B near the narrow circumferential groove 8 is further optimized.

As a result, the narrow circumferential groove 8 has an asymmetric substantially round bottom flask shape in the cross sectional view.

As shown in FIG. 6, the axial dimension ws1 of the axially outer portion 5B measured at the axially outermost point 13k of the radially inner curved portion 13 is preferably set in a range from 1.0 to 1.4 times the axial dimension ws of the radially outer surface 5b of the axially outer portion 5B.

Thereby, the balance between the rigidity of the axially outer portion 5B near the radially outer surface 5b and the rigidity of the axially outer portion 5B near the groove bottom 19 is improved to suppress uneven wear of the axially outer portion 5B.

The axial dimension ws of the radially outer surface 5b is preferably set in a range from 3% to 8% of the axial dimension wt (shown in FIG. 1) of the shoulder land part 5. Such axially outer portion 5B suppresses the rigidity of the axially inner portion 5A from becoming excessively high, and prevents shoulder wear due to slippage of the axially inner portion 5A.

The groove width w1 of the narrow circumferential groove 8 measured at its opened top 2k is less than the above-said maximum width wx (shown in FIG. 5) of the narrow circumferential groove 8 occurring on its groove bottom side.

Preferably, the groove width w1 is not less than 20%, more preferably not less than 30%, and preferably not more than 50% of the maximum width wx.

As a result, the volume of the shoulder land part 5 is secured to maintain its rigidity, and cracks occurring in the groove bottom can be suppressed.

Specifically, the groove width w1 is set in a range from 0.3 to 6.0 mm, preferably set in a range from 0.6 to 2.4 mm in this example.

The groove depth dl of the narrow circumferential groove 8 is preferably not more than 1.5 times, more preferably not more than 1.0 times, but preferably not less than 0.5 times the groove depth D1 of the shoulder main groove 3.

Such narrow circumferential grooves 8 suppress a large decrease in the rigidity of the axially outer portion 5B.

The radially outer surface 5b of the axially outer portion 5B is positioned radially inside the radially outer surface 5a of the axially inner portion 5A.

Preferably, the radial distance H3 between the radially outer surface 5b and the radially outer surface 5a is set in a range from 1.0 to 4.0 mm.

As a result, slippage of the radially outer surface 5b of the axially outer portion 5B is suppressed, and shoulder wear can be prevented.

As shown in FIG. 1, in the tread pattern of the present embodiment, the narrow circumferential groove 8 extends linearly and continuously in the tire circumferential direction, and the axially outer portion 5B extends linearly and continuously in the tire circumferential direction.

However, the narrow circumferential groove 8 may extend in a zigzag shape or a wavy shape.

The axially inner portion 5A is provided with shoulder narrow axial grooves 23.

The shoulder narrow axial grooves 23 extend axially outwardly from the shoulder main groove 3 and terminate within the axially inner portion 5A.

The shoulder narrow axial grooves 23 are arranged in the tire circumferential direction.

In the axially inner portion 5A, there are no grooves other than the shoulder narrow axial grooves 23.

The angle θ1 of the shoulder narrow axial grooves 23 with respect to the tire axial direction is not more than 10 degrees. In this example, the angle θ1 is 0 degree.

The shoulder narrow axial grooves 23 preferably have a groove width w2 of from 0.3 to 0.9 mm, a groove depth of from 0.5 to 1.5 mm, and an axial length L6 of from 1.0 to 5.0 mm.

The tread portion 2 in the present embodiment is further provided with a crown main groove 4 continuously extending in the tire circumferential direction.

The crown main groove 4 is disposed between each of the shoulder main grooves 3 and the tire equator C.

Thereby, the tread portion 2 is divided into a crown land part 7 between the two crown main grooves 4 on both sides of the tire equator, a pair of middle land parts 6 between the shoulder main grooves 3 and the crown main grooves 4, and a pair of the above-said shoulder land parts 5.

The shoulder main grooves 3 and the crown main grooves 4 are straight grooves extending parallel with the tire circumferential direction.

Thereby, the rigidity of the respective land parts near the main grooves 3 and 4 is maintained high to enhance the uneven wear resistance.

However, it is also possible that the shoulder main groove 3 and the crown main groove 4 extend in a zigzag shape or a wavy shape.

Cross sections taken along lines B-B of FIG. 1 are shown by solid lines of the shoulder main groove 3 and the crown main groove 4 of FIG. 2.

Cross sections taken along lines C-C of FIG. 1 are shown by broken lines of the shoulder main groove 3 and the crown main groove 4 of FIG. 2.

As shown in FIG. 2, each of the shoulder main groove 3 and the crown main groove 4 has an axially outer wall surface 25, an axially inner wall surface 26, and a groove bottom 27 connecting therebetween.

Here, the groove bottom 27 is where the groove depth is the deepest in each groove 3 and 4.

In each of the shoulder main groove 3 and the crown main groove 4, the groove bottom 27 may have a certain axial width.

In each of the shoulder main groove 3 and the crown main groove 4, the axially outer wall surface 25 and the axially inner wall surface 26 are inclined at an angle α with respect to the tire radial direction as shown in FIG. 2.

In the present embodiment, an angle α of each of the axially outer wall surface 25 and the axially inner wall surface 26 is cyclically varied in the tire circumferential direction.

In each of the shoulder main groove 3 and the crown main groove 4, the cycles of variation of the angle α of the axially outer wall surface 25 (for example, from minimum value to minimum value of the angle α) and the cycles of variation of the angle α of the axially inner wall surface 26 (for example, from minimum value to minimum value of the angle α)

are the same but shifted from each other by a half cycle.

In each of the shoulder main groove 3 and the crown main groove 4, the groove bottom 27 (or its widthwise center line 27c) extends in a wavy or zigzag manner, centering on the groove center line 3c, 4c shown in FIG. 1.

Such shoulder main groove 3 and crown main groove 4 can disperse the strain acting on the groove bottom 27 so as to suppress the occurrence of cracks at the groove bottom 27.

Preferably, the minimum value of the angle α of the axially outer wall surface 25 and the axially inner wall surface 26 is set in a range from 3 to 9 degrees, more preferably 15 to 21 degrees.

In the present embodiment, it is preferable that each of the shoulder main groove 3 and the crown main groove 4 has a groove width w1 of from 6 to 15 mm, and a groove depth D1 (shown in FIG. 2) of from 10 to 18 mm.

Each of the middle land parts 6 is provided with middle longitudinal grooves 30 extending in the tire circumferential direction, axially outer middle narrow axial grooves 31 extending from the adjacent shoulder main groove 3, and axially inner middle narrow axial grooves 32 extending from the adjacent crown main groove 4.

In the present embodiment, each of the middle longitudinal grooves 30 is a v-shaped bent groove whose both ends are terminated within the middle land part 6.

The groove width of the middle longitudinal grooves 30 is larger than the groove width w1 of the narrow circumferential groove 8 in this example.

The middle longitudinal grooves 30 in this example are first middle longitudinal grooves 30A bent toward the tread edge Te and second middle longitudinal grooves 30B bent toward the tire equator C.

The first middle longitudinal grooves 30A and the second middle longitudinal grooves 30B are arranged alternately in the tire circumferential direction.

The axially outer middle narrow axial grooves 31 and the axially inner middle narrow axial grooves 32 terminate within the respective middle land parts 6.

The first middle narrow grooves 31 are arranged in the tire circumferential direction. The number of the first middle narrow grooves 31 is larger than the number of the middle longitudinal grooves 30.

The second middle narrow grooves 32 are arranged in the tire circumferential direction. The number of the second middle narrow grooves 32 is larger than the number of the middle longitudinal grooves 30.

The crown land part 7 is provided with a narrow crown circumferential groove 35 extending continuously in the tire circumferential direction, crown lateral grooves 36 connecting between the narrow crown circumferential groove 35 and the crown main grooves 4, and crown narrow axial grooves 37 extending from the crown main grooves 4 toward the tire equator C.

The narrow crown circumferential groove 35 linearly extends on the tire equator C in this example.

The groove width of the narrow crown circumferential groove 35 is larger than that of the narrow circumferential groove 8 in this example.

The crown narrow axial grooves 37 are first crown narrow axial grooves 37A extending from the crown main groove 4 on one side in the tire axial direction of the tire equator, and terminating within the crown land part 7, and second crown narrow axial grooves 37B extending from the crown main groove 4 on the other side in the tire axial direction of the tire equator, and terminating within the crown land part 7.

The first crown narrow axial grooves 37A are arranged in the tire circumferential direction.

The second crown narrow axial grooves 37B are arranged in the tire circumferential direction.

In this example, the crown narrow axial grooves 37, the axially outer middle narrow axial grooves 31, and the axially inner middle narrow axial grooves 32 are the same as the shoulder narrow axial grooves 23 in respect to the groove width, the groove depth, the axial length, and the angle with respect to the tire axial direction.

The crown lateral grooves 36 each extend linearly while inclining with respect to the tire axial direction.

The crown lateral grooves 36 are first crown lateral grooves 36A extending from the crown longitudinal groove 35 to one side in the tire axial direction (right side in the figure), and second crown lateral grooves 36B extending from the crown longitudinal groove 35 to the other side in the tire axial direction (left side in the figure).

The first crown lateral grooves 36A and the second crown lateral grooves 36B are alternately arranged in the tire circumferential direction.

Each of the first crown lateral grooves 36A and the second crown lateral grooves 36B extends to one of the crown main grooves 4 so that the crown lateral groove (36A or 36B) takes the entirety of one of the crown narrow axial grooves 37 into the groove bottom of the crown lateral groove.

while detailed description has been made of a preferable embodiment of the present invention, the present invention can be embodied in various forms without being limited to the illustrated embodiment.

Comparison Tests

Based on the tread pattern shown in FIG. 1, pneumatic tires of size 295/75R22.5 (rim size 22.5×8.25) were experimentally manufactured as test tires (including working example tires Ex.1-Ex.9 and comparative example tire Ref. 1) The test tires had specifications shown in Table 1, and were tested for uneven wear resistance and groove bottom crack resistance as follows.

<Uneven Wear Resistance and Groove Bottom Crack Resistance Test>

Each test tire was mounted on a standard wheel rim and inflated to 760 kPa, and run on a asphalt road surface at a speed of 80 km/hr for 20,000 km under 100% of the standard load.

Then, the radially outer surface of the axially inner portion of the shoulder land part was visually checked and the uneven wear state was evaluated.

Further, the bottom of the narrow circumferential groove was visually checked and the occurrence of cracks was evaluated. The results are shown in Table 1 based on Comparative example tire Ref.1 as being 100, wherein the larger number is better.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| H1 (mm) | 4.5 | 4.0 | 5.0 | 3.5 | 4.0 | 4.0 | 4.0 | 4.0 | 4.0 | 4.0 |
| H2 (mm) | 4.0 | 5.5 | 5.5 | 4.0 | 4.5 | 4.5 | 4.5 | 4.5 | 4.5 | 4.5 |
| R2 (mm) | 3.0 | 3.5 | 3.5 | 2.5 | 3.0 | 3.0 | 3.0 | 3.0 | 3.0 | 3.0 |
| d1 (mm) | 15.2 | 15.2 | 15.2 | 15.2 | 13.0 | 5.0 | 15.2 | 15.2 | 15.2 | 15.2 |
| w1 (mm) | 0.6 | 0.6 | 0.6 | 0.6 | 0.6 | 0.6 | 1.2 | 1.2 | 2.4 | 2.4 |
| w1/wx | 0.3 | 0.3 | 0.3 | 0.3 | 0.3 | 0.3 | 0.6 | 0.3 | 0.8 | 0.3 |
| uneven wear resistance | 100 | 120 | 120 | 122 | 120 | 110 | 120 | 115 | 110 | 105 |
| groove bottom crack resistance | 100 | 105 | 105 | 100 | 105 | 110 | 100 | 102 | 100 | 102 |

From the test results, it was confirmed that the tires according to the present invention were superior to the comparative example tire in respect to the uneven wear resistance and groove bottom crack resistance.

DESCRIPTION OF THE REFERENCE SIGNS 1 tire
2 tread portion
3 shoulder land part
8 narrow circumferential groove
9 groove bottom deepest point
10 axially inner wall surface
11 axially outer wall surface
12 radially inner curved portion of axially inner wall surface 10
12e radially outer end of radially inner curved portion 12
13 radially inner curved portion of axially outer wall surface 11
13e radially outer end of radially inner curved portion 13
15 radially outer flat portion of axially inner wall surface 10
17 radially outer flat portion of axially outer wall surface 11
19 groove bottom

The invention claimed is:

1. A tire comprising:
a tread portion having a tread surface and provided with a shoulder land part including a tread edge,
the shoulder land part provided with a narrow circumferential groove which extends in the tire circumferential direction and has an axially inner wall surface, an axially outer wall surface and a groove bottom including a deepest point,
wherein
in a cross section of the narrow circumferential groove being perpendicular to the longitudinal direction of the narrow circumferential groove:
the axially inner wall surface is composed of a radially outer flat portion and a radially inner curved portion, wherein
the radially outer flat portion extends in a tire radial direction from the tread surface, and
the radially inner curved portion is composed of
a convex surface extending radially inwardly from the radially inner end of the radially outer flat portion, and
a concave surface extending from the convex surface to the deepest point of the groove bottom, and
in the cross section of the narrow circumferential groove being perpendicular to the longitudinal direction of the narrow circumferential groove:
the axially outer wall surface is composed of a radially outer flat portion and a radially inner curved portion, wherein
the radially outer flat portion extends in the tire radial direction from the tread surface, and
the curved portion is composed of
a convex surface extending radially inwardly from the radially inner end of the radially outer flat portion, and
a concave surface extending from the convex surface to the deepest point of the groove bottom,
wherein
in the cross section of the narrow circumferential groove being perpendicular to the longitudinal direction of the narrow circumferential groove:
the radially outer flat portion of the axially inner wall surface and the radially outer flat portion of the axially outer wall surface are parallel with each other, and have a widthwise center line therebetween which defines a groove center line of the narrow circumferential groove;
the deepest point is positioned axially outside the groove center line of the narrow circumferential groove;
the radially inner end of the radially outer flat portion of the axially outer wall surface is positioned radially outside the radially inner end of the radially outer flat portion of the axially inner wall surface;
the radially outer end of the radially outer flat portion of the axially outer wall surface is positioned radially inside the radially outer end of the radially outer flat portion of the axially inner wall surface; and a distance L4 in the tire axial direction between the axially innermost end of the curved portion and the radially outer flat portion of the axially inner wall surface is smaller than a distance L5 in the tire axial direction between the axially outermost end 13k of the radially inner curved portion and the radially outer flat portion of the axially outer wall surface.

2. The tire according to claim 1, wherein the deepest point of the groove bottom is positioned axially outside a radially inward extension of the radially outer flat portion of the axially outer wall surface.

3. The tire according to claim 2, wherein
the shoulder land part is defined between the tread edge and a shoulder main groove extending continuously in the tire circumferential direction, whereby the shoulder land part is divided into an axially outer portion between the narrow circumferential groove and the tread edge, and an axially inner portion between the narrow circumferential groove and the shoulder main groove,
the radially outer surface of the axially outer portion is positioned radially inside the radially outer surface of the axially inner portion, and
the radially outer surface of the axially outer portion is parallel with the radially outer surface of the axially inner portion.

4. The tire according to claim 3, wherein an axial dimension Ws of the radially outer surface of the radially outer surface of the axially outer portion is in a range from 3% to 8% of an axial dimension Wt of the shoulder land part.

5. The tire according to claim 1, wherein
the shoulder land part is defined between the tread edge and a shoulder main groove extending continuously in the tire circumferential direction, whereby the shoulder land part is divided into an axially outer portion between the narrow circumferential groove and the tread edge, and an axially inner portion between the narrow circumferential groove and the shoulder main groove, and
the radially outer surface of the axially outer portion is positioned radially inside the radially outer surface of the axially inner portion.

6. The tire according to claim 5, wherein the groove depth of the narrow circumferential groove is not more than 1.5 times the groove depth of the shoulder main groove.

7. The tire according to claim 5, wherein an axial dimension Ws1 of the axially outer portion measured at the axially outermost point of the radially inner curved portion of the axially outer wall surface is in a range from 1.0 to 1.4 times the axial dimension Ws of the radially outer surface of the axially outer portion.

8. The tire according to claim 5, wherein
the shoulder main groove is a straight groove having an axially outer wall surface and an axially inner wall surface,
the axially outer wall surface and the axially inner wall surface are each inclined at an angle with respect to the tire radial direction which is cyclically varied in the tire circumferential direction, and
cycles of variation of the angle of the axially outer wall surface and cycles of variation of the angle of the axially inner wall surface are the same but shifted from each other by a half cycle.

9. The tire according to claim 8, wherein the axially inner portion is provided with no grooves other than shoulder narrow axial grooves extending axially outwardly from the shoulder main groove and terminate within the axially inner portion.

10. The tire according to claim 9, wherein the tread portion is provided with a crown main groove continuously extending in the tire circumferential direction between the shoulder main groove and a tire equator.

11. The tire according to claim 10, wherein
the crown main groove is a straight groove having an axially outer wall surface and an axially inner wall surface,
the axially outer wall surface and the axially inner wall surface are each inclined at an angle with respect to the tire radial direction which is cyclically varied in the tire circumferential direction, and
cycles of variation of the angle of the axially outer wall surface and cycles of variation of the angle of the axially inner wall surface are the same but shifted from each other by a half cycle.

12. The tire according to claim 5, wherein an axial dimension Ws of the radially outer surface of the radially outer surface of the axially outer portion is in a range from 3% to 8% of an axial dimension Wt of the shoulder land part.

13. The tire according to claim 1, wherein the groove width of the narrow circumferential groove measured at its opened top is not more than the maximum width of the narrow circumferential groove occurring on its groove bottom side.

* * * * *